United States Patent
Whittaker

Patent Number: 5,910,795
Date of Patent: *Jun. 8, 1999

[54] DIGITAL IMAGE SIGNAL PROCESSING

[75] Inventor: James Robert Whittaker, Kings Langley, United Kingdom

[73] Assignee: VideoLogic Limited, Hertfordshire, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/339,123

[22] Filed: Nov. 14, 1994

[30] Foreign Application Priority Data

Nov. 15, 1993 [GB] United Kingdom .................... 9323529

[51] Int. Cl.$^6$ ..................................................... G09G 5/00
[52] U.S. Cl. ........................................... 345/127; 345/507
[58] Field of Search ..................................... 345/127, 118, 345/119, 120, 121, 128, 129, 130, 131, 132, 133, 136, 137, 138, 185, 201, 123, 439, 438, 507, 515, 516; 395/166, 164; 348/298, 299

[56] References Cited

U.S. PATENT DOCUMENTS

| | | | |
|---|---|---|---|
| 5,148,523 | 9/1992 | Harlin et al. | 395/166 |
| 5,200,738 | 4/1993 | Fumoto et al. | 345/123 |

FOREIGN PATENT DOCUMENTS

| | | |
|---|---|---|
| 0 177 640 A2 | 4/1986 | European Pat. Off. . |
| 2 177 567 | 1/1987 | United Kingdom . |
| 2 210 760 | 6/1989 | United Kingdom . |
| 2 231 471 | 11/1990 | United Kingdom . |
| 2 266 425 | 10/1993 | United Kingdom . |
| WO 88/06769 | 9/1988 | WIPO . |

*Primary Examiner*—Xiao Wu
*Attorney, Agent, or Firm*—Flynn, Thiel, Boutell & Tanis, P.C.

[57] ABSTRACT

A raster scanned image may be scaled up or down for display on e.g. a portion of a computer display. This is achieved by dividing the image into a plurality of image cells each with a horizontal width less than that of the whole image. A smoothing algorithm is then applied to the lines of each cell in turn to generate new pixel data in dependence on the scaling operation to be performed. The scaling means stores a number of lines of data from a cell the number being dependent on the particular smoothing algorithm being used. To facilitate scanning of the image cell structure additional sync pulses are generated. These are cell horizontal and cell vertical sync pulses.

15 Claims, 4 Drawing Sheets

DIGITAL IMAGE SIGNAL PROCESSING

This invention relates to the processing of digital image signals. The invention is particularly suitable for use in multimedia systems designed to handle both video and graphics images, but is not limited to such use.

In digital image processing there is often a desire to form in real time an output signal the individual pixels of which are formed from several adjacent pixels of an input signal. To take a simple example, each output pixel may be formed from four input pixels, these being the two pixels of the input signal which are nearest the output signal on each of two adjacent input lines.

Such a requirement exists for instance when an image is to be scaled, that is expanded or shrunk. In a multimedia system it may for example be desired to scale an incoming video signal so that it will fit a window in a graphics image. The window may itself be of continuously varying size.

The video signal will comprise a succession of frames, with each frame formed of a succession of horizontal lines, as is very well-known in raster scanning systems. When the scaling includes an expansion in the vertical direction, the necessary extra lines could be generated by replication or repetition of lines. However, this can lead to "blockiness" in the resultant image, and to overcome this a pixel smoothing algorithm is used. Such algorithms require pixel data from at least two horizontally adjacent pixels and at least two vertically adjacent pixels to be combined.

In order to execute such an algorithm it has been conventional to provide a store to store at least one line of pixel data in order to have two or more vertically adjacent pixels available. To form a line score in an integrated circuit requires a large amount of silicon compared to that required to process the data.

We have appreciated that substantial cost savings could be achieved by eliminating the need for a line store in such a system.

The invention in its various aspects is defined in the independent claims below, to which reference should now be made. Advantageous features of the invention are set forth in the appendant claims.

The invention will be described in more detail, by way of example, with reference to the drawings, in which.

Figure 1:
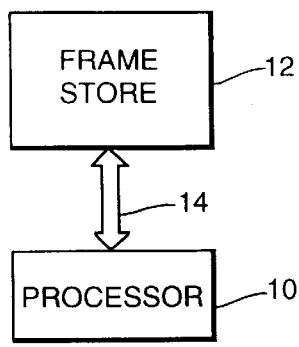
FIG. 1 shows one simple system in which an embodiment of the invention can be incorporated.
Figure 2:
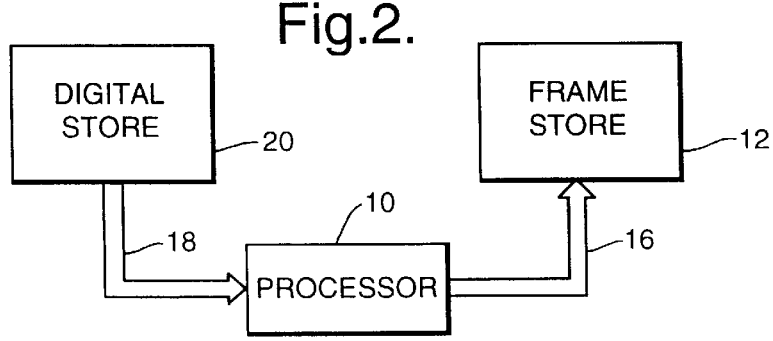
FIG. 2 shows another system in which an embodiment of the invention can be incorporated.

FIGS. 1 and 2 are two very simple diagrams illustrating environments in which a system embodying the invention can be used. As shown in FIG. 1, a processor 10 is coupled to a frame store 12 by a bidirectional bus 14. The processor can read image portions held in the frame store, process them, and return the resultant to the frame store. The frame store may have one area which can be used to store off-image pixel data for processing before insertion into the image.

In FIG. 2, the processor 10 writes to the store 12 over a bus 16 which need not, in principle be a bidirectional bus. Pixel data is input to the processor through another bus 18 from a digital store 20. This could for example be a hard disc store associated with a computer graphics system.

In either case the pixel data in the frame store 12 is of high definition which is considerably greater than for a conventional video signal.

The processor 10 in either of FIG. 1 or FIG. 2 provides a scaling function and can enlarge or reduce an image portion so as to fit a desired region of the frame store 12. In effecting this scaling function, the processor also executes a simple pixel smoothing algorithm, which involves forming each output pixel by a weighted addition of four input pixels, these being the two closest input pixels on each of two adjacent input lines. The processor achieves this without the need to store a complete input line.

Figure 3:
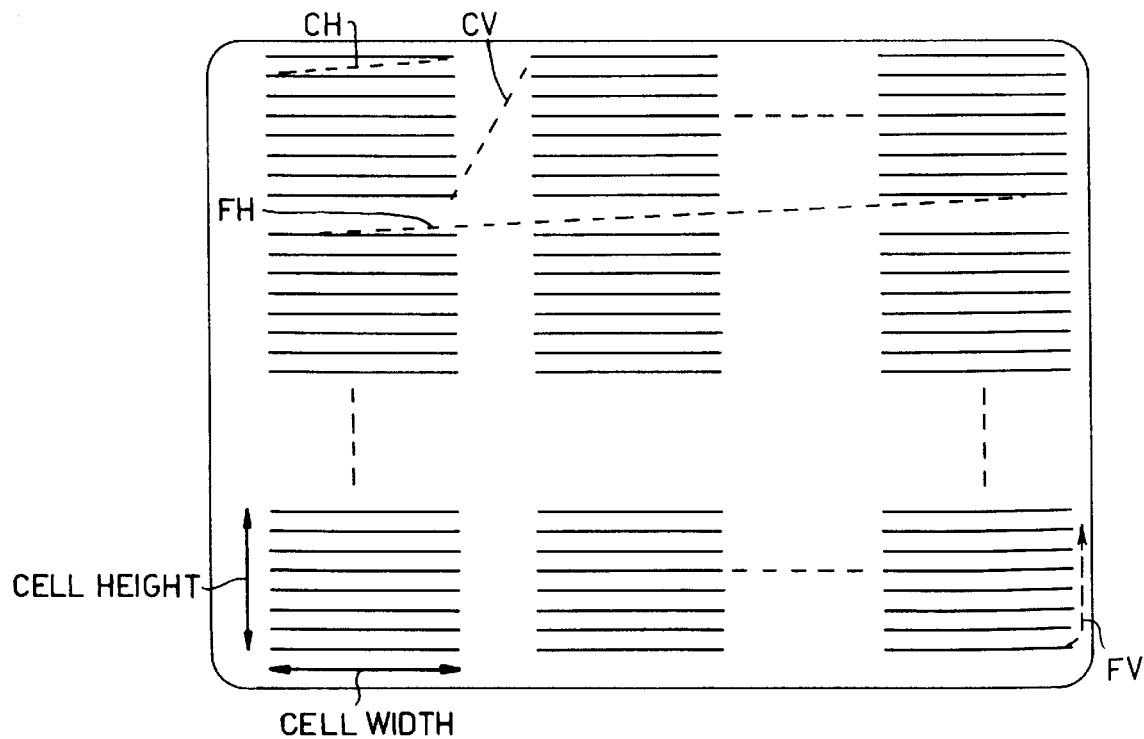
FIG. 3 illustrates a first scanning raster that can be used in an embodiment of the invention.

The processor achieves this advantage by using the special scanning raster shown in FIG. 3.

Figure 4:
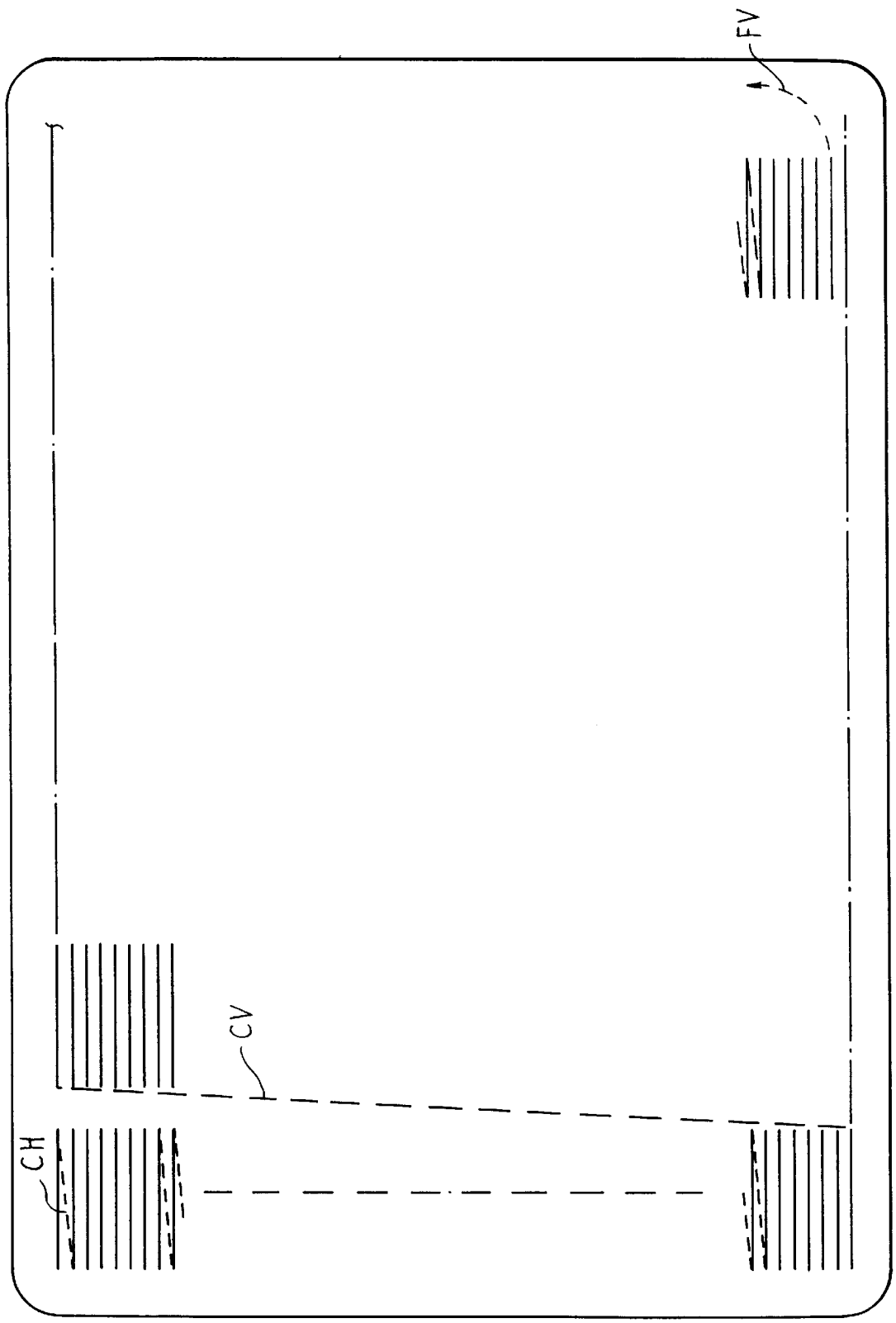
FIG. 4 illustrates a second scanning raster that can be used in an embodiment of the invention.

Referring to FIG. 3, it is seen that instead of receiving a full scanning line at a time, the processor acts by reading successively from store a small part of a plurality of input lines. Thus it may read the first eight pixel values of the first line followed by the first eight pixel values of the second line, and so on for a predetermined number of lines. As shown in FIG. 3, this predetermined number is eight, but it can be anything from four up to the full height of the image. This latter option is illustrated in FIG. 4. Whatever its height, this first scanned block can be termed the first image cell.

After scanning the first eight pixels of the predetermined number of lines, the processor then returns to line 1 and scans the next eight pixels of line 1, the next eight pixels of line 2, and so on. In its simplest form the algorithm operates on the four closest pixels and thus only two lines of the cell need to be stored at any one time. Because the algorithm needs to operate on two adjacent pixels, it is advantageous for the processor to keep available the last pixel of each line from the first cell as this will need to be combined with the first pixel of each line in the second image cell. Alternatively those pixels can be rescanned by using an overlapping cell structure.

This operation continues until the full width of the image has been scanned for the predetermined number of lines, eight in this case. As shown in FIG. 3, the processor then scans the first eight pixels of the second block of eight lines, this forming the cell immediately below the first cell in the image. Because the pixel smoothing algorithm always needs to operate on pixels from two adjacent lines it requires the last line of the previous cell to smooth with the first line of the following vertically adjacent image cell. Preferably these lines are rescanned at the start of the next vertically adjacent cell by using an overlapping cell structure. This operation continues until the whole image has been scanned.

In the special case shown in FIG. 4 where each cell fills the full height of the image, there is only one horizontal scan of cells and there is no requirement to store the last line of each cell for use with the next cell.

In a normal scanning raster, there are two types of synchronising pulse, namely a horizontal sync. pulse which indicates the end of a line, and a vertical sync. pulse which indicates the end of a frame. In the system illustrated in FIG. 3 or 4, an increased number of synchronising pulses are required.

In FIG. 3 there are four sync. pulses. After each eight pixels, there is a cell-horizontal pulse CH, which indicates that a flyback is required to the beginning of that cell on the next line. After each image cell, there is a cell-vertical pulse CV, which indicates that a flyback is required to the start of the next cell to the right. When the scanning reaches the right-hand side of the image, there is a frame-horizontal pulse FH, which causes flyback to the next cell down at the lefthand side of the image. This is similar to the horizontal flyback of a conventional raster scan, though of course it occurs less frequently. Finally, at the end of each frame or full image scan, there is a frame-vertical pulse FV, which is similar to the vertical sync. pulse of a conventional raster scan.

In the scanning system of FIG. 4, there are three sync. pulses, these being the CH, CV and FV pulses. However, there is no FH pulse (the FV pulse implies a horizontal as well as a vertical flyback).

In a real time scaling operation, an image may be scaled by using the scanning pattern of FIG. 3 or FIG. 4. The cells have a constant width of typically 8 pixels, and a small buffer of this length is therefore provided. With only this length of buffer, the lines of the cell may be scanned, and vertical and horizontal linear interpolation applied. The cells are overlapped by one pixel, as described above, which allows the edges of the cells to be correctly matched up against each other to provide a seamless output display.

In a preferred embodiment 2 buffers of 8 pixels in length are provided. This enables the algorithm to be implemented with rather more versatility than the single line version. It will be appreciated that in both cases considerable cost savings arise because it is not necessary to provide memory for a whole line or the display.

Figure 5:
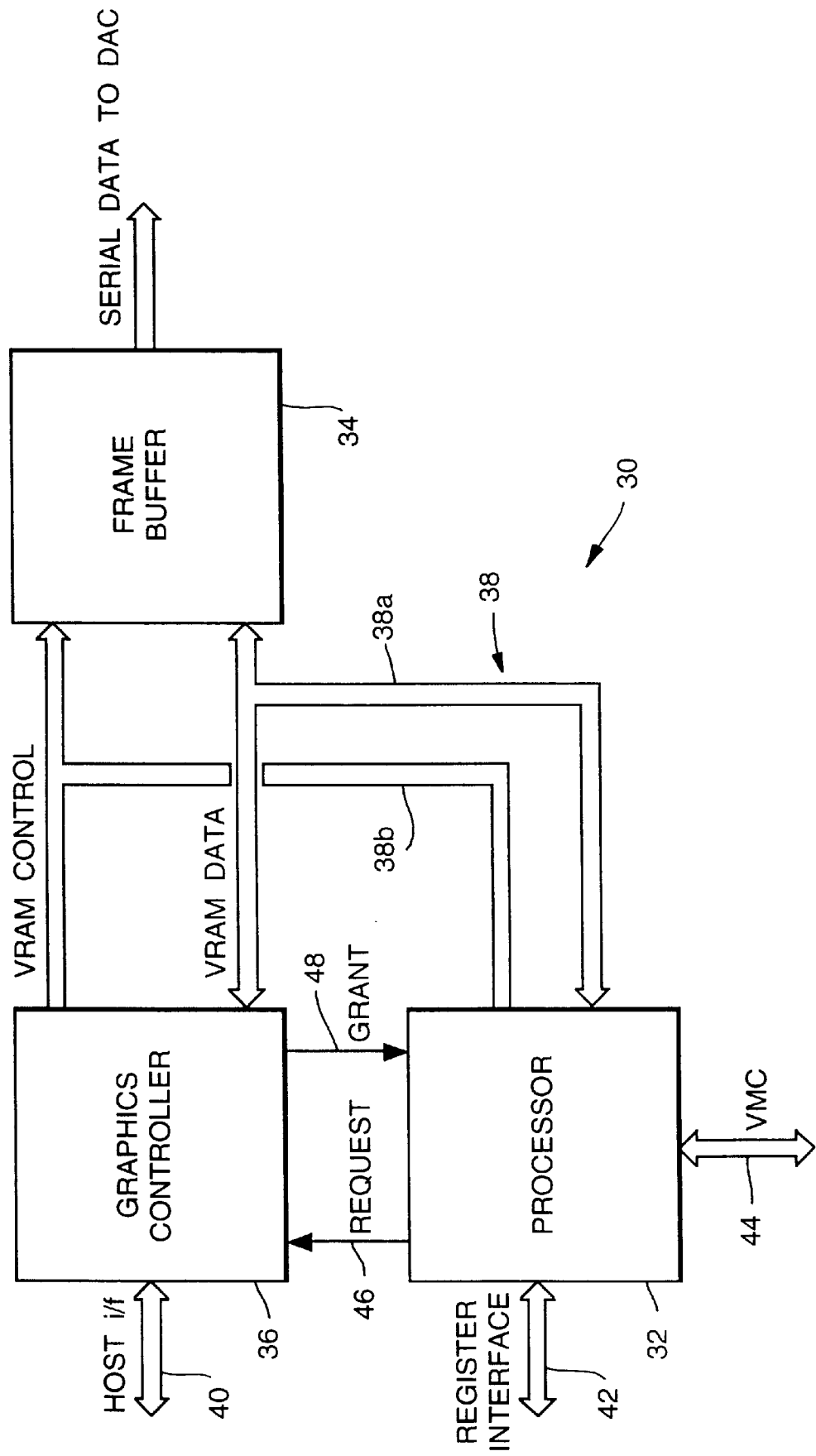
FIG. 5 is a block diagram showing the hardware of a system embodying the invention.

The system may be implemented in a video/graphics system 30 of the type illustrated in FIG. 5.

FIG. 5 shows a processor 32 coupled to a frame store or frame buffer 34 which takes the form of a VRAM store. The system also includes a graphics controller 36, and a VRAM bus 38 comprising a data bus 38a and control bus 38b which connects the processor 32, frame buffer 34 and graphics controller 36.

The graphics controller 36 is coupled to a bidirectional bus 40 for input and output of graphics data, and the processor 32 is coupled to a register via a bidirectional bus 42 and also to a bidirectional bus 44 for input or output of video data. The bus 44 may be a VESA media channel (VMC), see Video Electronics Standards Association, 2150 North First Street, San Jose, Calif. 95131-2029, U.S.A.

The processor 32 and graphics controller 36 are coupled by a request line 46 and a grant line 48, to provide bus arbitration and avoid contention on the VRAM bus 38. Thus the graphics controller controls the processor's access to the VRAM bus.

The system of FIG. 5 is designed for incorporation into a personal computer (PC) such as made by IBM or a PC compatible therewith. Such computers are of two types. In one type the graphics controller 36 and the frame buffer 34 are on the computer motherboard. In this type, the processor 32 is mounted on an expansion board which is fitted into one of the computer's expansion slots, and is connected to the VRAM bus on the motherboard by a flying lead. In the other type of computer, the graphics controller 36 and frame buffer 34 are not on the motherboard, but are on a separate graphics card. In this case, the existing graphics card is removed and replaced by a new card on which is mounted the whole of the circuitry shown in FIG. 5.

Circuitry based on that shown in FIG. 5 can be used in other computer display systems, however, and may for example be incorporated in work stations.

Figure 6:
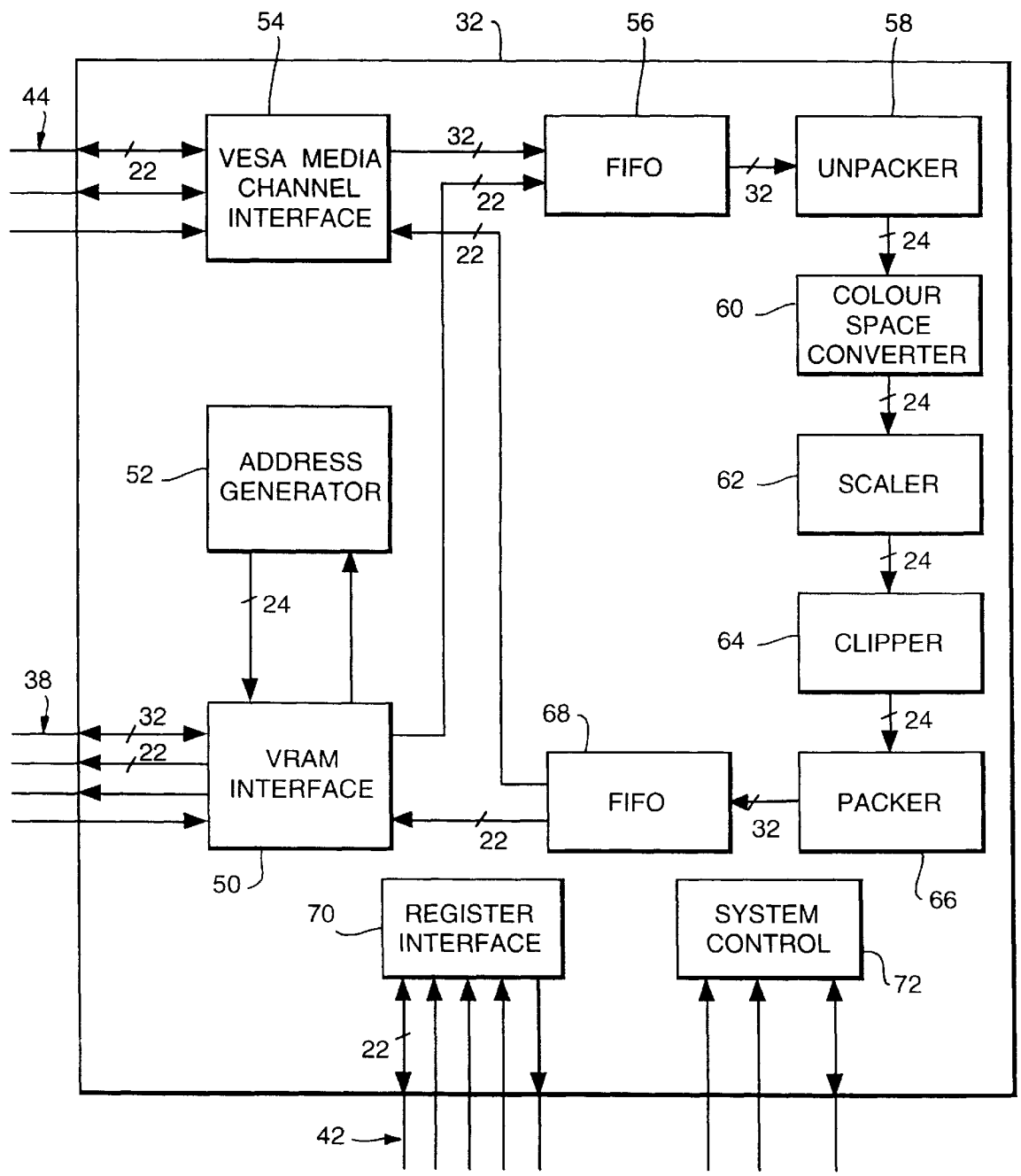
FIG. 6 shows in more detail the construction of the processor of FIG. 5.

The more detailed structure of the processor 32 is shown in FIG. 6. The processor comprises a VRAM interface 50 coupled with the VRAM bus 38. An address generator 52 is associated with the VRAM interface. A VESA media channel (VMC) interface 54 is coupled with the VESA media channel. Both the VRAM interface and the VMC interface provide outputs to a signal processing chain which commences with a FIFO buffer store 56. The output of the store is applied to an unpacker 58. The input to the unpacker comprises 32-bit words, and the output comprises pixel-by-pixel data, typically in the form of 24-bit pixels with eight bits for each of red, green and blue. The received data may be in a number of possible formats; typically the input data may have 15 or 16 bits per pixel, and the pixels may be combined into the 32-bic words. The unpacker disassembles them into a standard processing format. It may if necessary also decompress the data.

The output of the unpacker 58 is applied to a colour space converter 60 which may convert the signal from YUV form to RGB form. The converter 60 may be of conventional form. The output of the converter 60 is then applied to a scaler 62 which enlarges or reduces the image as desired and also executes a pixel smoothing algorithm, as described above. The scaler includes the 2 buffers of one cell line each in length e.g. 8 pixels in length and thus has available all the data required for the smoothing algorithm.

The output from the scaler 62 is then applied to a clipper 64. The clipper defines a window in which the image portion scaled by the scaler 62 is to appear. It operates by setting a mask on all pixels which exists outside a programmable rectangular region defining the window. The output of the clipper is then applied to a packer 66 which reverses the operation of the unpacker 58, and the resultant is returned through a FIFO buffer 68 to the VRAM interface or the VMC interface, as appropriate.

The processor 32 also includes a register interface 70, which is irrelevant for present purposes, and system control 72 the function of which will be apparent to those skilled in the art.

The signal processing chain operates in a pipeline mode. The signal passing through the signal processing chain comprises pixel data interspersed with the CH, CV, FV and possibly FH sync. pulses as described above. Additional signals can be incorporated to convey masking information in order to allow portions of the image to be prevented from affecting the graphics frame buffer. In this way, windows and other overlaying objects such as text characters can be mixed with the video.

The signal processing chain is designed to process two quite separate signal patterns in a multiplexed fashion. The two signals and the processing applied to them are termed the two "contexts". It is periodically necessary to switch between the two contexts. The existence of a much greater number of sync. pulses that occur in a normal video signal provides many more opportunities for context switching. This has the advantage that the context switching can occur much more frequently, so that both signals appear to be being processed in real time with no perceptible delay.

Passing the sync. pulse down the modules of the signal processing chain allows a module to add or delete the sync. as needed to provide the correct output. The separate modules of the pipeline transfer data between each other under the control of two signals, request and valid. These two signals implement a protocol which allows a module to halt either the modules upstream of itself or downstream of itself. In this way, processing which involves the addition or deletion of words in the pipeline can be performed without the various modules getting out of step and without needing buffer memories. This is particularly useful when unpacking more than one pixel from a single memory location or in packing them into one or more words in the unpacker 58 or packer 66 respectively.

The pipeline may, in a modification, allow both commands and data to be passed along the pipeline, allowing commands which affect the pipeline to be embedded in the flow of data, presenting them to modules at exactly the right time to affect the pixels following. Modules whose only input is commands, such as a line rendering or video decompressor module, may then be easily included.

The address generator 52 is, in accordance with this invention, designed co cause the VRAM interface to read from the frame buffer 34 in accordance with the special raster scan illustrated in FIG. 3 or FIG. 4. The scaler 62 can then provide a pixel smooching function without having to have a full line of the image available. This leads to a much more economical construction for the processor.

The address generator 52 has to be more complicated and needs to be able to follow the more complex scanning pattern, making use of the extra sync. pulses that the signal contains. At any one time, only one address is needed, so it is possible to share the adder used to calculate the next address to be used for reading or writing between these functions. Since the pixels are being read and written in cell scanning order, registers are needed to specify the width and height of the cells to be read. On writing, internal registers are used to keep track of the rightmost pixel written in a cell, so that when the next cell to the right is sent, the correct address to write to is automatically calculated by the address generator.

It should be noted that in the clipping operation in the clipper 64 it is necessary to keep multiple registers which record the rightmost and bottommost pixel which have been reached in a cell. The sync. pulses in the pipeline then select which of the saved registers should be used to update the count, and compare with registers indicating the borders of the clipping rectangle.

In a typical installation the frame buffer 34 will have a region which is not part of the displayed image. An input image portion, which may be either a video image received over the VMC bus or a graphics signal received by the graphics controller over the graphics bus of the host computer, is written into the undisplayed region of the frame buffer. The image portion is then withdrawn by the processor 32, using the scanning pattern of FIG. 3 or FIG. 4, and scaled and clipped as required, and then re-written into the frame buffer 34 at the location where it is required to be displayed.

When the processor is reading from or writing to the VMC bus, it will normally operate with conventional video scanning and does not provide any scaling in the manner described above. An important feature of the system described, however, is the ability of the processor to select only a portion of the displayable image from the frame buffer and supply this portion only as a digital video output over the VMC bus. In this way an image may be recorded onto a standard video recorder or used for presentations on a large-screen television. Use of only a portion of the computer's image for the presentation output allows the operator to control the presentation using software running in windows which are not visible to the audience.

A portion of the image in the frame buffer will normally form a quite adequate video output, as the image in the frame buffer has a much higher definition than a normal video signal. This video output feature can be applied to systems other than those that use the special scanning raster of FIG. 3 or FIG. 4.

The above discussion has assumed non-interlaced progressive scanning in the frame buffer. It will be appreciated that it can be adapted to operate with interlaced signals. It may be noted that if an interlaced signal is to be scaled with a reduction factor of ½ or less, one field can simply be ignored. If the reduction factor is between ½ and unity, then a "dominant field" scaling algorithm can be used. In this, the whole of one field is used and periodic selected lines of the other field are taken to make up the required number.

We have appreciated that in a processor based system the processor cache memory may be used to store the lines of pixel data from each cell in turn. Typically it will store two cell lines. This then avoids the need to provide any special memory to implement the invention. Cache memories are usually substantially larger than the memory required to store two lines of cell data. Therefore, speed can be optimised by reading in a succeeding line whilst a pair of lines are being operated on by the smoothing algorithm. The refill algorithm used by the code memory can be tailored to the specific cell structure and smoothing algorithm used.

I claim:

1. Digital image signal processing apparatus, comprising:

an image store for storing an image scanned with a raster of horizontal lines;

signal processing means for operating on an input image signal to provide an output image signal, each pixel of the output image signal being derived by combining nearby pixels from two or more lines of the input image signal; and read/write means for reading from the image store a signal to provide an input image signal for the signal processing means and/or for writing the output image signal from the signal processing means to the image store, the read/write means accessing the image store in accordance with a succession of image cells, each cell comprising a fraction only of the horizontal width of the image and a plurality of horizontal lines within that fraction, wherein the read/write means includes means for storing image data for at least one fractional line of an image cell and for less fractional lines than the number of lines that comprise a whole cell dependent on the number of nearby pixels to be combined by the signal processing means.

2. Apparatus according to claim 1, in which adjacent image cells partially overlap in the horizontal and/or vertical direction.

3. The apparatus according to claim 1, in which the storing means in the read/write means stores two fractional lines of image data from an image cell.

4. Apparatus according to claim 1, in which the storing means in the read/write means stores image data for the last pixel in each horizontal line of an image cell for use in processing with an adjacent image cell.

5. The apparatus according to claim 1, in which the storing means in the read/write means stores one fractional line of image data from an image cell.

6. A method for processing digital image signals comprising the steps of:

storing an image scanned with a raster of horizontal lines in an image store;

reading data from the image store by accessing a succession of image cells, each cell comprising a fraction only of the horizontal width of the image store;

storing at least one line fraction from an image cell and less than the total number of line fractions forming the image cell as a function of the amount of image data required by a predetermined combination algorithm;

combining nearby pixels from said line fractions of each image cell to produce an output pixel; and writing said output pixel to the image store.

7. A method according to claim 6, in which the storing step comprises storing two line fractions of image data from an image cell.

8. A method according to claim 6, in which the storing step comprises the step of storing one line fraction of image data from an image cell.

9. A method of scaling a raster scanned digital image for display comprising the step of:

reading image data from an off-screen store which contains the raster scanned image in a succession of image cells, each image cell having a horizontal width smaller than the horizontal width of the raster scanned image;

storing lines of image data from each image cell, the number of lines stored being at least one and fewer than the total number of lines forming each image cell, the number being dependent on the number required to be simultaneously available to perform a scaling operation;

combining a plurality of pixel data contained within said stored lines of image data of each image cell, in dependence on the scaling operation, to produce pixel data of an output image;

writing pixels of the output image to an image display store.

10. The method according to claim 9, in which the output pixels are written to only a portion of the image display store.

11. The method according to claim 9, in which predetermined areas of the image display store are reserved for the display of other data.

12. The method of claim 9, wherein in said storing step, a plurality of lines forming each image cell are stored.

13. An apparatus for scaling a raster scanned digital image for display comprising:

a store containing raster scanned digital image data to be scaled;

means for reading image data from the store as a succession of image cells, each image cell having a horizontal width smaller than the horizontal width of the raster scanned image;

means for storing lines of image data that form each image cell, the number of image cell lines stored being at least one and fewer than the number of image cell lines forming a complete image cell, the number of image cell lines being stored being dependent on the number of lines required by a scaling operation;

means for combining image data from a plurality of pixels of each image cell in dependence on the scaling operating performed to produce output pixels of a scaled image;

display storage means for storing pixels of the output image for display; and means for writing output pixels to the display storage means.

14. The apparatus according to claim 13, in which the storing means comprises a store for one line of image data from an image cell.

15. The apparatus according to claim 13, in which the storing means comprises a store for two lines of image data from an image cell.

* * * * *